(12) United States Patent
Kiyota

(10) Patent No.: US 7,275,847 B2
(45) Date of Patent: Oct. 2, 2007

(54) HEADLAMP OPTICAL AXIS ADJUSTING METHOD

(75) Inventor: Hiroshi Kiyota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/547,387

(22) PCT Filed: Mar. 5, 2004

(86) PCT No.: PCT/JP2004/002851

§ 371 (c)(1),
(2), (4) Date: Apr. 28, 2006

(87) PCT Pub. No.: WO2004/079324

PCT Pub. Date: Sep. 16, 2004

(65) Prior Publication Data
US 2006/0239019 A1 Oct. 26, 2006

(30) Foreign Application Priority Data

Mar. 6, 2003 (JP) .............................. 2003-059664

(51) Int. Cl.
*F21V 19/02* (2006.01)
(52) U.S. Cl. ...................................... 362/530; 362/514
(58) Field of Classification Search ................ 362/512, 362/514, 523, 529–530; 356/121–122
See application file for complete search history.

(56) References Cited

U.S. PATENT DOCUMENTS 5,504,574 A * 4/1996 Murata ....................... 356/121

FOREIGN PATENT DOCUMENTS

JP 2-38940 A 2/1990
JP 6-105212 B 12/1994

* cited by examiner

*Primary Examiner*—Thomas M. Sember
*Assistant Examiner*—Julie A. Shallenberger
(74) *Attorney, Agent, or Firm*—Arent Fox LLP (57) ABSTRACT

A headlight optical axis adjustment method where, on an imaged picture of a light distribution pattern of low beam illumination from a master headlight whose optical axis has been adjusted, a relative positional relationship between a horizontal and oblique line of a light/dark boundary line. A reference point is determined on the imaged picture to correspond to a bulb center. An acceptance frame is set based on an imaged position of an intersection of the horizontal and oblique line. On an imaged picture of a light distribution pattern of low beam illumination from a headlight to be adjusted, a horizontal and oblique line of a light/dark boundary line are detected based on a relative positional relationship with the reference point, and the optical axis of the headlight to be adjusted is adjusted so that an intersection of the detected horizontal and oblique lines is within the acceptance frame.

2 Claims, 12 Drawing Sheets

HEADLAMP OPTICAL AXIS ADJUSTING METHOD

FIELD OF INVENTION

Cross-Reference to Related Application

This application is a National Stage entry of International Application No. PCT/JP2004/002851, filed Mar. 5, 2004, the entire specification claims and drawings of which are incorporated herewith by reference.

The present invention relates to a headlight optical axis adjustment method for adjusting a low beam optical axis of a headlight that has a vertically adjustable optical axis and, in particular, to a headlight optical axis adjustment method for adjusting a low beam optical axis of a headlight that has a vertically adjustable optical axis in a state in which the headlight is installed in an automobile, the method comprising carrying out in sequence a first step of, on an imaged picture of a light distribution pattern of low beam illumination from a master headlight whose optical axis has been adjusted, the picture being imaged at a predetermined distance in front of the master headlight, determining a relative positional relationship between a reference point and a horizontal line and an oblique line of a light/dark boundary line, and setting an acceptance frame based on an imaged position of an intersection point of the horizontal line and the oblique line; and a second step of, on an imaged picture of a light distribution pattern of low beam illumination from a headlight to be adjusted whose optical axis is to be adjusted, the picture being imaged at the predetermined distance in front of the headlight to be adjusted, detecting a horizontal line and an oblique line of a light/dark boundary line based on the relative positional relationship with the reference point, and adjusting the optical axis of the headlight to be adjusted so that an intersection point of the detected horizontal and oblique lines is present within the acceptance frame.

BACKGROUND ART

An arrangement in which a relative positional relationship between a reference brightest point and a horizontal line and an oblique line of a light/dark boundary line is determined on an imaged picture of low beam illumination from a master headlight whose optical axis has been adjusted, and when adjusting the optical axis of a headlight to be adjusted whose optical axis is to be adjusted, the horizontal line and the oblique line are detected on an imaged picture of low beam illumination from the headlight to be adjusted using the relative positional relationship determined for the master headlight, and the optical axis of the headlight to be adjusted is adjusted so that the intersection point of the horizontal line and the oblique line is present within an acceptance frame is known from, for example, Japanese Patent Publication No. 6-105212.

However, in this conventional arrangement, since the reference point for detecting the horizontal line and the oblique line of the light/dark boundary line on the imaged picture is defined as the brightest point on the imaged picture, the brightest point easily varies due to an error in bulb mounting position, an uneven reflector coating, etc. Because of this, even if the optical axis is adjusted so that the intersection point of the horizontal line and the oblique line of the light/dark boundary line is within the acceptance frame, the actual optical axis might deviate from an acceptance standard, and there is a possibility that the quality of the optical axis adjustment and automobile productivity might be affected.

DISCLOSURE OF INVENTION

The present invention has been accomplished under the above-mentioned circumstances, and it is an object thereof to provide a headlight optical axis adjustment method that can enhance the precision of optical axis adjustment.

In order to attain the above object, according to a first aspect of the present invention, there is provided a headlight optical axis adjustment method for adjusting a low beam optical axis of a headlight that has a vertically adjustable optical axis in a state in which the headlight is installed in an automobile, the method comprising carrying out in sequence: a first step of, on an imaged picture of a light distribution pattern of low beam illumination from a master headlight whose optical axis has been adjusted, the picture being imaged at a predetermined distance in front of the master headlight, determining a relative positional relationship between a reference point and a horizontal line and an oblique line of a light/dark boundary line and setting an acceptance frame based on an imaged position of an intersection point of the horizontal line and the oblique line; and a second step of, on an imaged picture of a light distribution pattern of low beam illumination from a headlight to be adjusted whose optical axis is to be adjusted, the picture being imaged at the predetermined distance in front of the headlight to be adjusted, detecting a horizontal line and an oblique line of a light/dark boundary line based on the relative positional relationship with the reference point and adjusting the optical axis of the headlight to be adjusted so that an intersection point of the detected horizontal line and oblique line is present within the acceptance frame; characterized in that in the first and second steps a position on the imaged picture corresponding to a bulb center that is set in advance on a front face lens of the master headlight and the headlight to be adjusted is determined as the reference point.

The relative positional relationship between the bulb center, which is set in advance on the front face lens of the headlight that emits a low beam, and the intersection point on the light/dark boundary line fluctuates little due to an error in bulb mounting position in the headlight, an uneven reflector coating, etc.; in accordance with the first aspect, the horizontal line and the oblique line of the light/dark boundary line of the headlight to be adjusted are detected using as the reference point the position, on the imaged picture, that corresponds to the bulb center, which is set in advance on the front face lens of both the master headlight and the headlight to be adjusted, and the optical axis is adjusted so that the intersection point of the detected horizontal and oblique lines is within the acceptance frame, thus enabling the precision of the optical axis adjustment to be enhanced.

Further, according to a second aspect of the present invention, in addition to the arrangement of the first aspect, in the first step the reference point on the imaged picture is determined according to measurement of vertical and lateral positions of the bulb center, which is set in advance on the front face lens of the master headlight, and in the second step the position of the bulb center, which is set in advance on the front face lens of the headlight to be adjusted, is estimated based on an image of light reflected from an area of a reflector of the headlight to be adjusted and projected on a screen, and the estimated position of the bulb center is employed as the reference point. In accordance with the second aspect, when carrying out optical axis adjustment of the headlight to be adjusted, it is unnecessary to measure the vertical and lateral positions of the bulb center on the front face lens, and when there are a large number of headlights to be adjusted the optical axis can be adjusted efficiently.

BRIEF DESCRIPTION OF THE DRAWINGS

FIG. 1 to FIG. 12 show one embodiment of the present invention.

BEST MODE FOR CARRYING OUT THE INVENTION

Modes for carrying out the present invention are explained below by reference to one embodiment of the present invention shown in the attached drawings.

Figure 1:
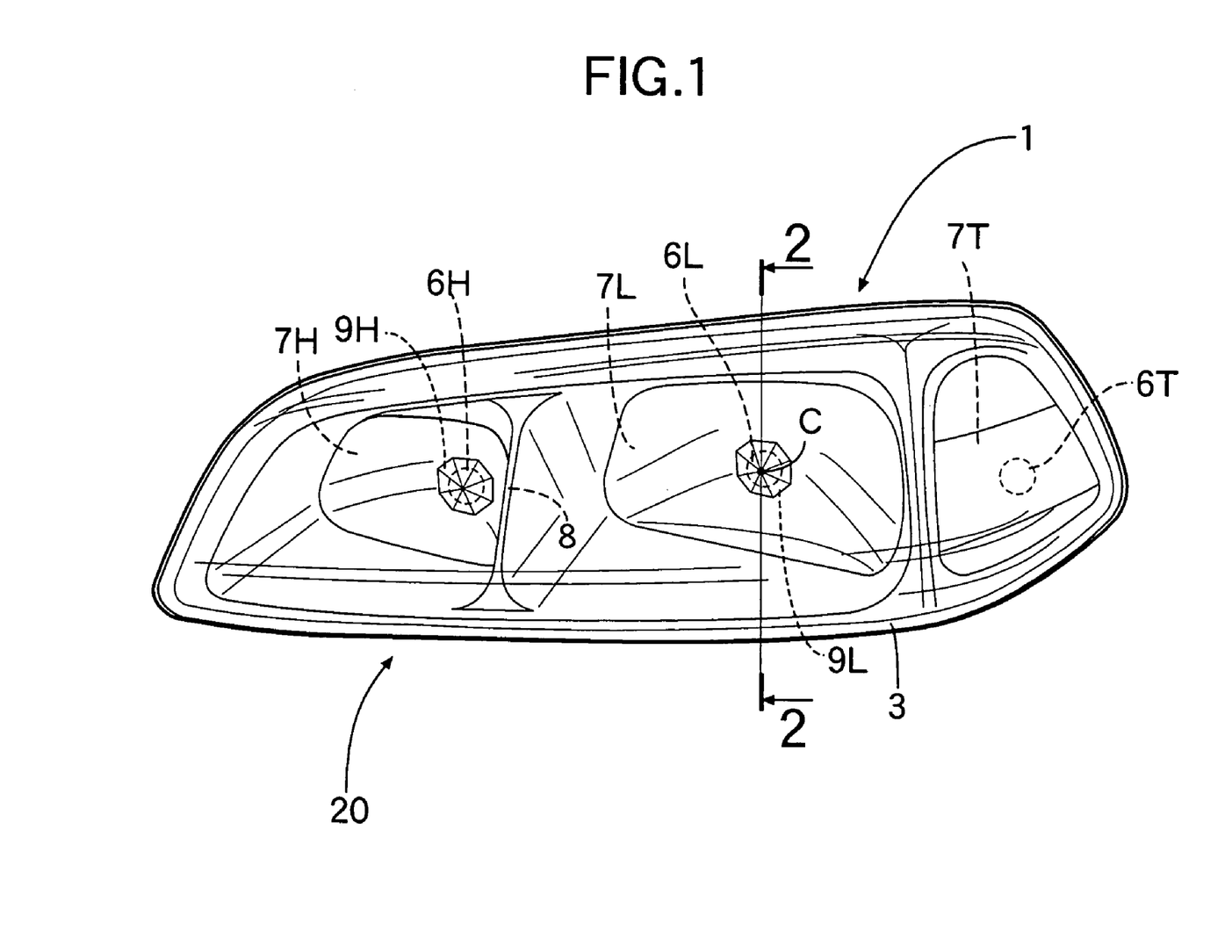
FIG. 1 is a front view of a headlight.
Figure 2:
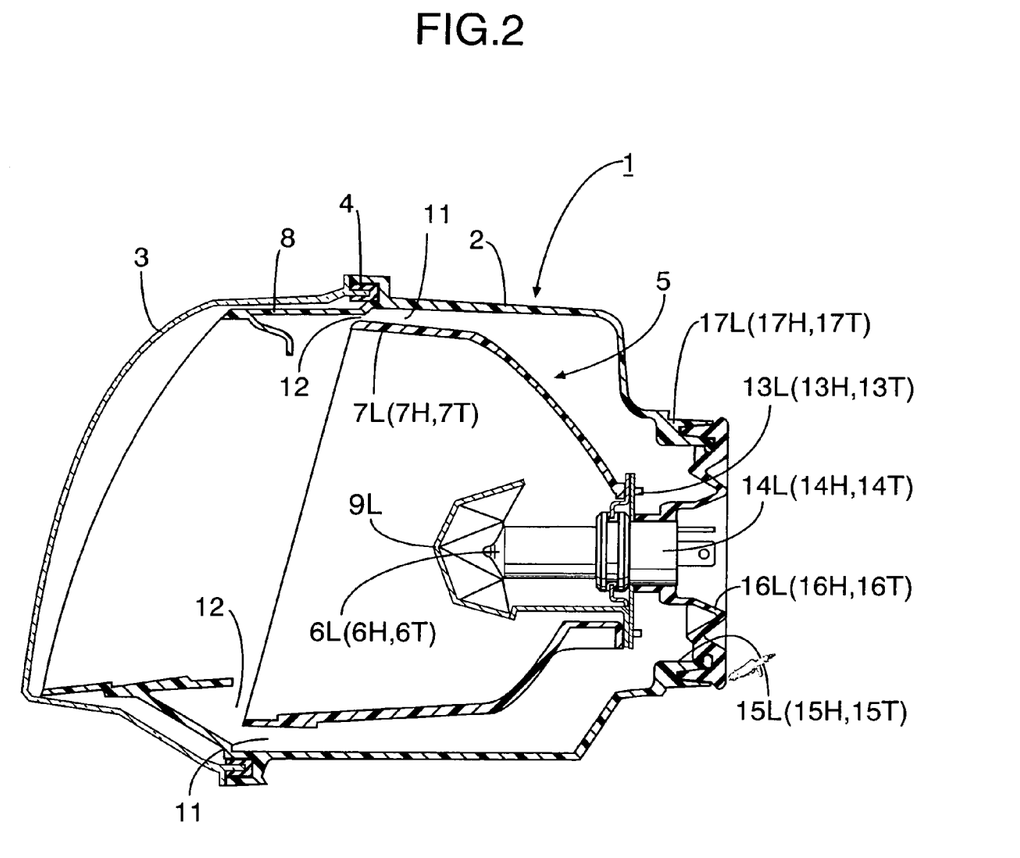
FIG. 2 is a sectional view along line 2-2 in FIG. 1.

Referring firstly to FIG. 1 and FIG. 2, a housing 2 of a headlight 1 on the left side of an automobile is made in the form of a bowl that is open on a front face thereof, and a front face lens 3 is joined to an open end of the front face of the housing 2 via a seal 4. A laterally long housing chamber 5 is formed between the housing 2 and the front face lens 3, and a high beam bulb 6H, a low beam bulb 6L, and a turn signal bulb 6T are arranged in the housing chamber 5 in that order from the inside with respect to the lateral direction of the vehicle body.

Reflectors 7H, 7L, and 7T surrounding the corresponding bulbs 6H, 6L, and 6T and an integral partition hood 8 are contained within the housing chamber 5, the partition hood 8 separating front face openings of the reflectors 7H, 7L, and 7T from each other and being held between the housing 2 and the front face lens 3. Furthermore, shades 9H and 9L for controlling light distribution are supported by the reflectors 7H and 7L so as to cover the high beam bulb 6H and the low beam bulb 6L respectively from the front thereof.

Each of the reflectors 7H, 7L, and 7T is supported in the housing 2 so as to form gaps 11 and 12 between itself and the housing 2 and the partition hood 8 and, in particular, the reflector 7L of the low beam bulb 6L is supported in the housing 2 so that the optical axis of the low beam bulb 6L can be adjusted in the vertical direction. An area of the front face lens 3 corresponding to the low beam bulb 6L is marked by engraving, etc. with a bulb center C, which is an intersection point of the front face lens 3 with a forward extension line of the low beam bulb 6L when it is in a vertically neutral position.

Bulb insertion apertures 13H, 13L, and 13T are provided in rear walls of the reflectors 7H, 7L, and 7T, and sockets 14H, 14L, and 14T, to which the bulbs 6H, 6L, and 6T are attached, are detachably fitted in the bulb insertion apertures 13H, 13L, and 13T. Furthermore, insertion tubes 17H, 17L, and 17T, which form openings 15H, 15L, and 15T that correspond to the sockets 14H, 14L, and 14T, are provided integrally with a rear wall of the housing 2, and the openings 15H, 15L, and 15T are blocked by rubber hoods 16H, 16L, and 16T inserted between the sockets 14H, 14L, and 14T positioned in the openings 15H, 15L, and 15T and the insertion tubes 17H, 17L, and 17T.

A right side headlight of the automobile is formed laterally symmetrically with the left side headlight 1.

In such headlights 1, when adjusting the optical axis of low beam illumination, that is, the illumination from the low beam bulb 6L that is reflected by the reflector 7L and is emitted forward, the vertical and lateral positions of the bulb center C on the front face lens 3 of the left and right headlights 1 fitted in the automobile are measured for a large number of automobiles, and an automobile that has values in the vicinity of medians of these measurements is selected as a master automobile. Based on the results of measuring light distribution levels of a large number of headlights, a pair of left and right headlights 1 that have values in the vicinity of medians of these light distribution levels are fitted in the master automobile as master headlights.

Figure 3:
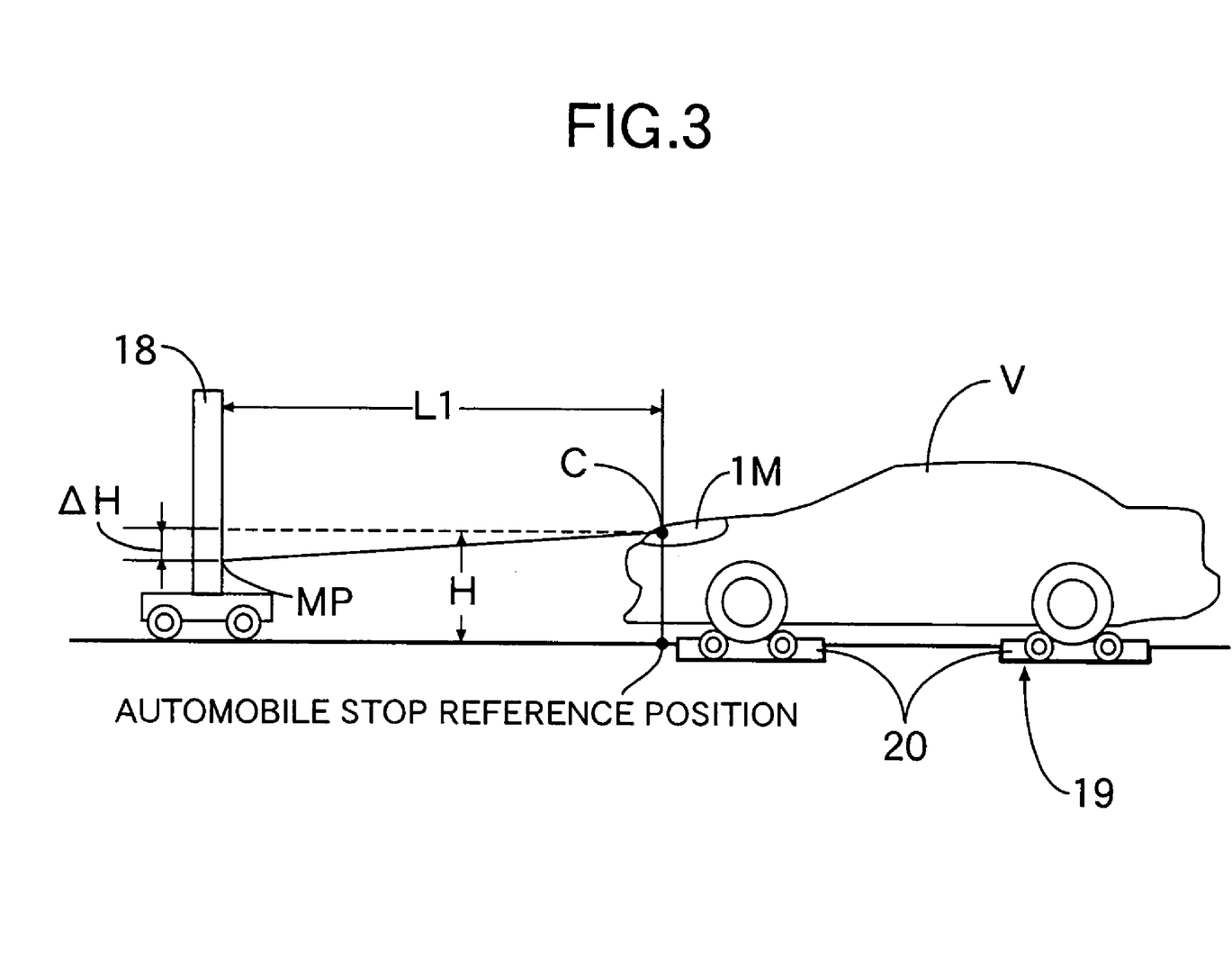
FIG. 3 is a schematic side view showing a state in which an optical axis of a master headlight is adjusted in a dark room.
Figure 4:
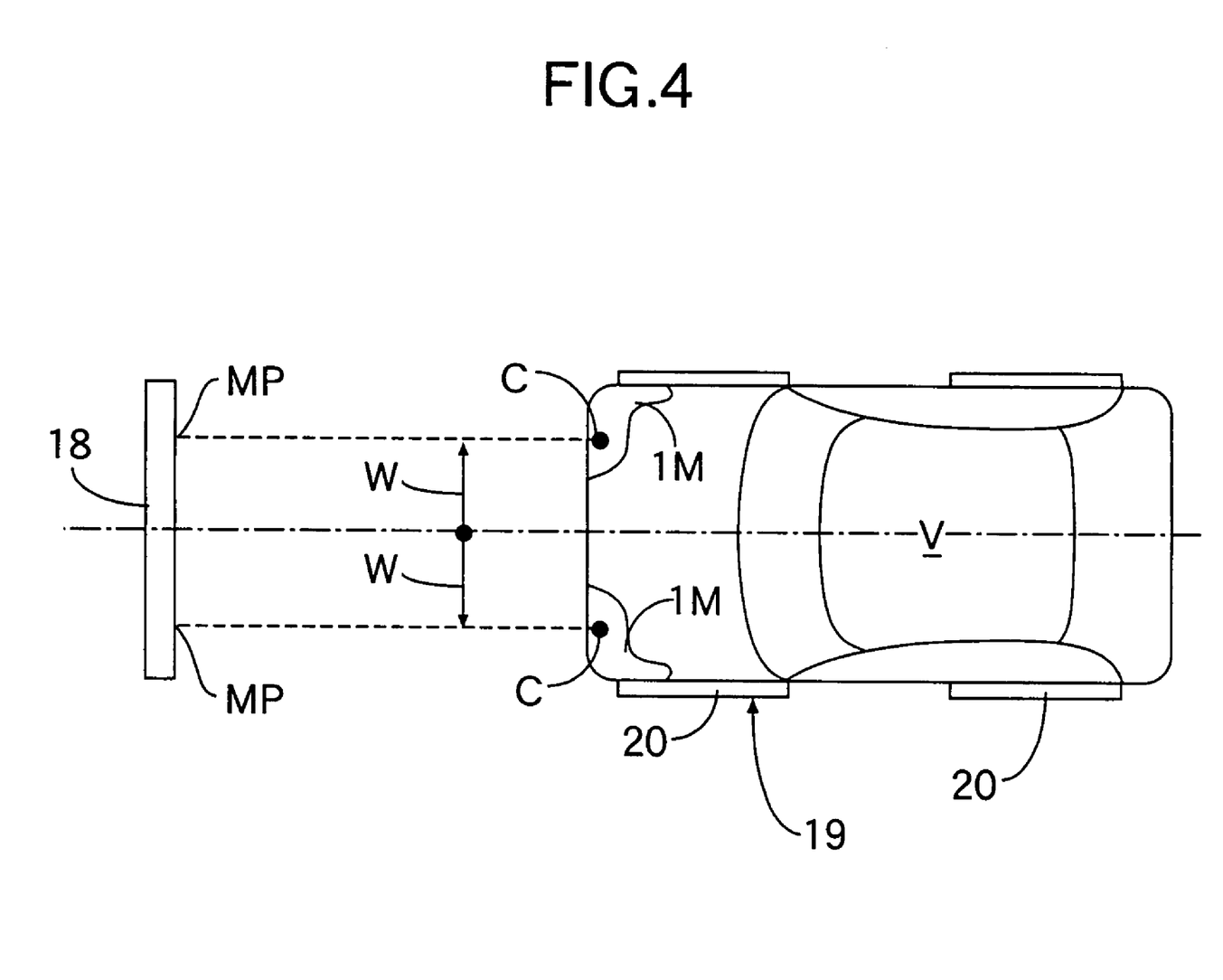
FIG. 4 is a schematic plan view of FIG. 3.

In FIG. 3 and FIG. 4, the master automobile V equipped with the left and right master headlights 1M is moved into a dark room, and the master automobile V is placed on carriages 20 of an automobile alignment system 19 and made to face a screen 18 placed within the dark room straight on. During this process, the carriages 20 of the automobile alignment system 19 are positioned so that the bulb centers C of the left and right master headlights 1M of the master automobile V coincide with an automobile stop reference position, and the distance between the screen 18 and the bulb centers C of the left and right master headlights 1M becomes a first set distance L1, for example, 10 m, which is a value recommended for vehicle inspection. In this state, after measuring the heights H of the bulb centers C of the two master headlights 1M and the distances W between the bulb centers C of the two master headlights 1M and the center of the vehicle width, the screen 18 is illuminated in turn with low beams from the left and right master headlights 1M.

Figure 5:
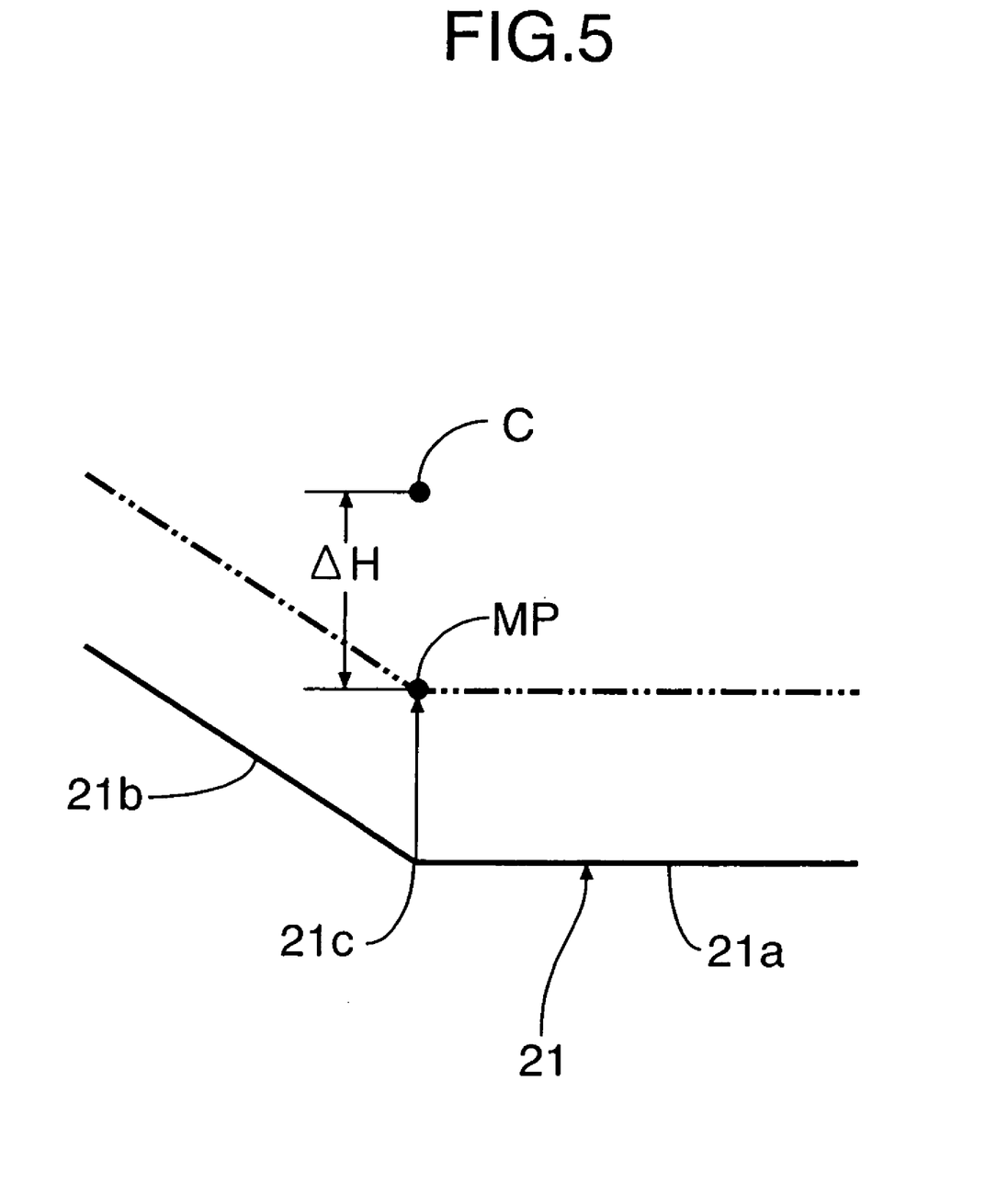
FIG. 5 is a diagram showing a light/dark boundary line on a screen.

Low beam illumination on the screen 18 shows a light/dark boundary line 21 having a horizontal line 21a and an oblique line 21b on the screen 18 as shown in FIG. 5 in the case of, for example, the left master headlight 1M. It is therefore necessary to carry out adjustment so that an intersection point 21c of a horizontal line 21a and an oblique line 21b of the light/dark boundary line 21 is at a set position that does not deviate laterally from the corresponding bulb centers C of the left and right master headlights 1M on the screen 18 and that is below the height H of the bulb center C by ΔH, for example, 10 cm, which is determined as a value recommended for vehicle inspection, and the optical axes of the left and right master headlights 1M are adjusted in sequence so that the intersection point 21c is positioned at a marking point MP marked at the set position on the screen 18.

Figure 6:
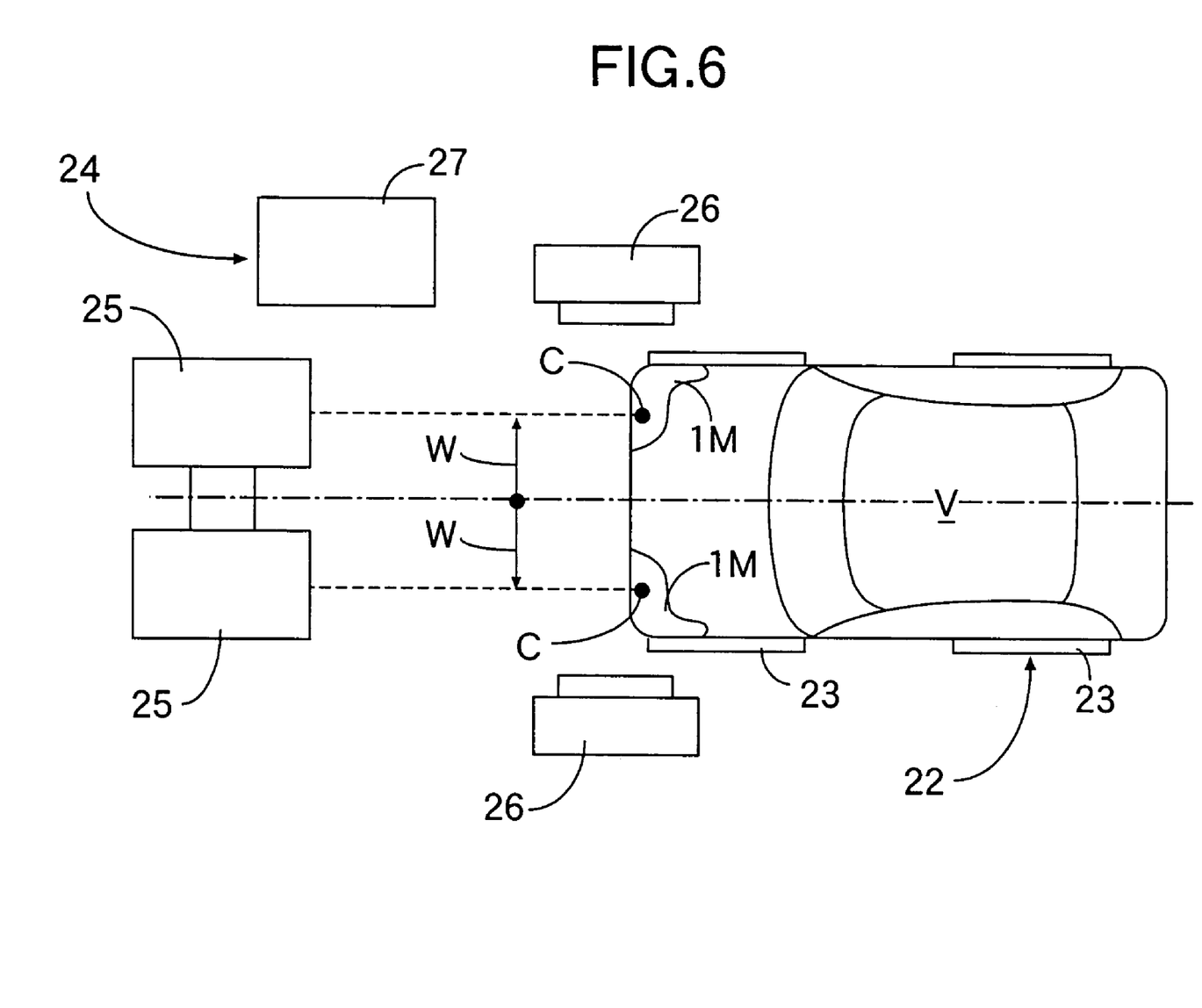
FIG. 6 is a schematic plan view showing a state in which the master headlight is made to face a measurement unit straight on, FIG. 7 is a schematic left side view of FIG. 6.
Figure 7:
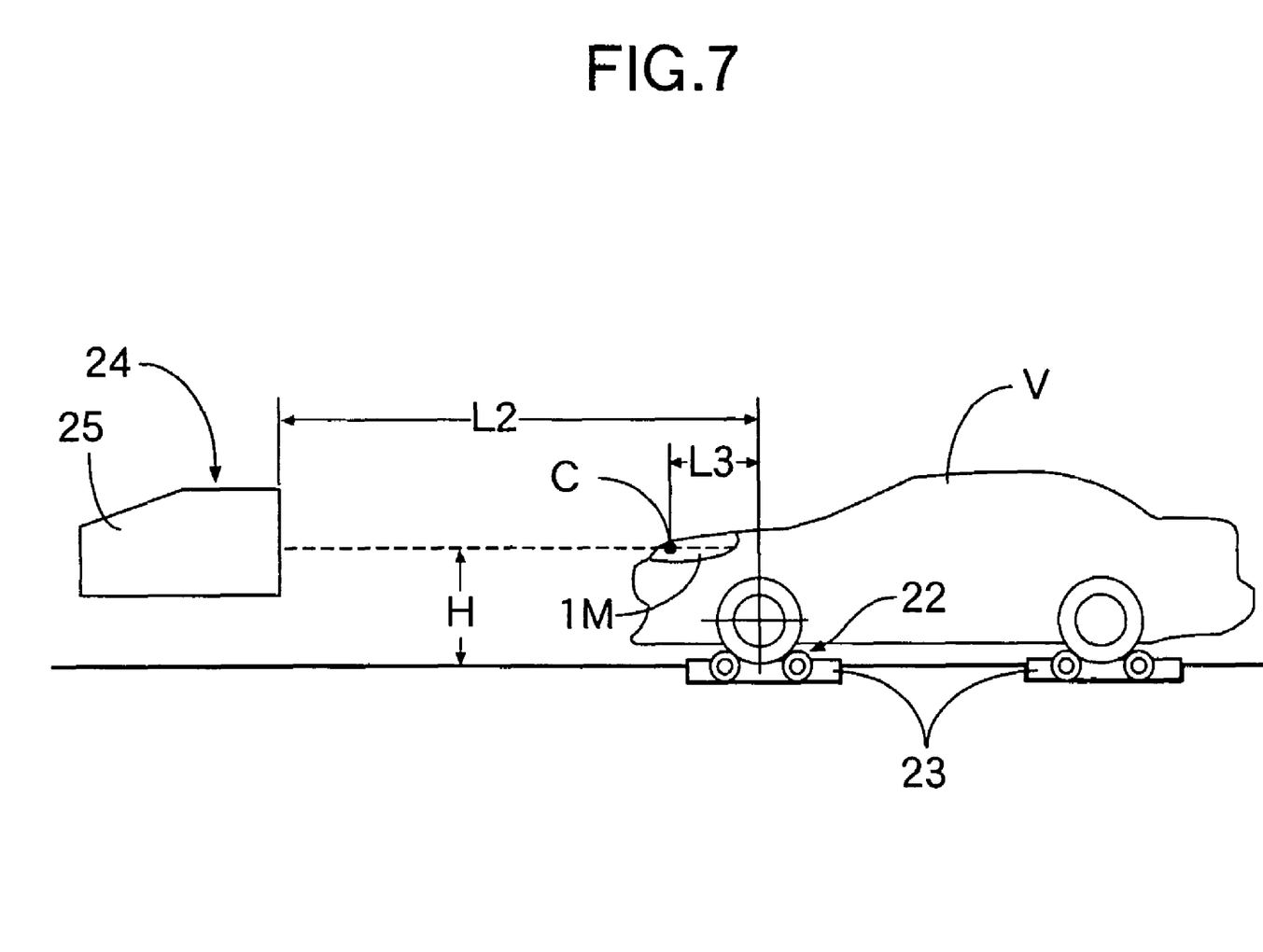

The master automobile V having the optical axis adjustment of the master headlights 1M thereof completed in this way is moved to an optical axis inspection step in a completed vehicle inspection line, and as shown in FIG. 6 and FIG. 7, the master automobile V is placed on carriages 23 of an automobile alignment system 22.

An optical axis measurement system 24 provided in the optical axis inspection step is formed from a pair of left and right measurement units 25 disposed in front of the master automobile V, monitors 26 disposed on the left and right sides at a front part of the master automobile V, and a measurement operation panel 27.

Among the carriages 23 of the automobile alignment system 22 in the optical axis inspection step, the carriage 23 at the forward end is stopped at a position that is separated from the two measurement units 25 by a second set distance L2, the second set distance L2 being set so as to be shorter than the first set distance L1 and being, for example, 3600 mm.

Moreover, the two measurement units 25 can be adjusted vertically in a coupled manner, and the distances of the two measurement units 25 from a central line between the two measurement units 25 can be adjusted individually, and by inputting the height H of the bulb centers C measured when adjusting the optical axis within the dark room and the distances W between the two bulb centers C and the center of the vehicle width through the measurement operation panel 27, the two measurement units 25 are moved vertically and laterally so as to make the centers thereof coincide with the bulb centers C of the two master headlights 1M at the front end of the master automobile V, thus making them face the corresponding bulb centers C straight on. Furthermore, a distance L3 between the bulb centers C of the master headlights 1M and the carriage 23, which is stopped at the position that is separated from the two measurement units 25 by the second set distance L2, is measured, and in order to determine a distance (L2-L3) between the bulb centers C and the measurement units 25, the distance L3 measured above is input through the measurement operation panel 27.

Figure 8:
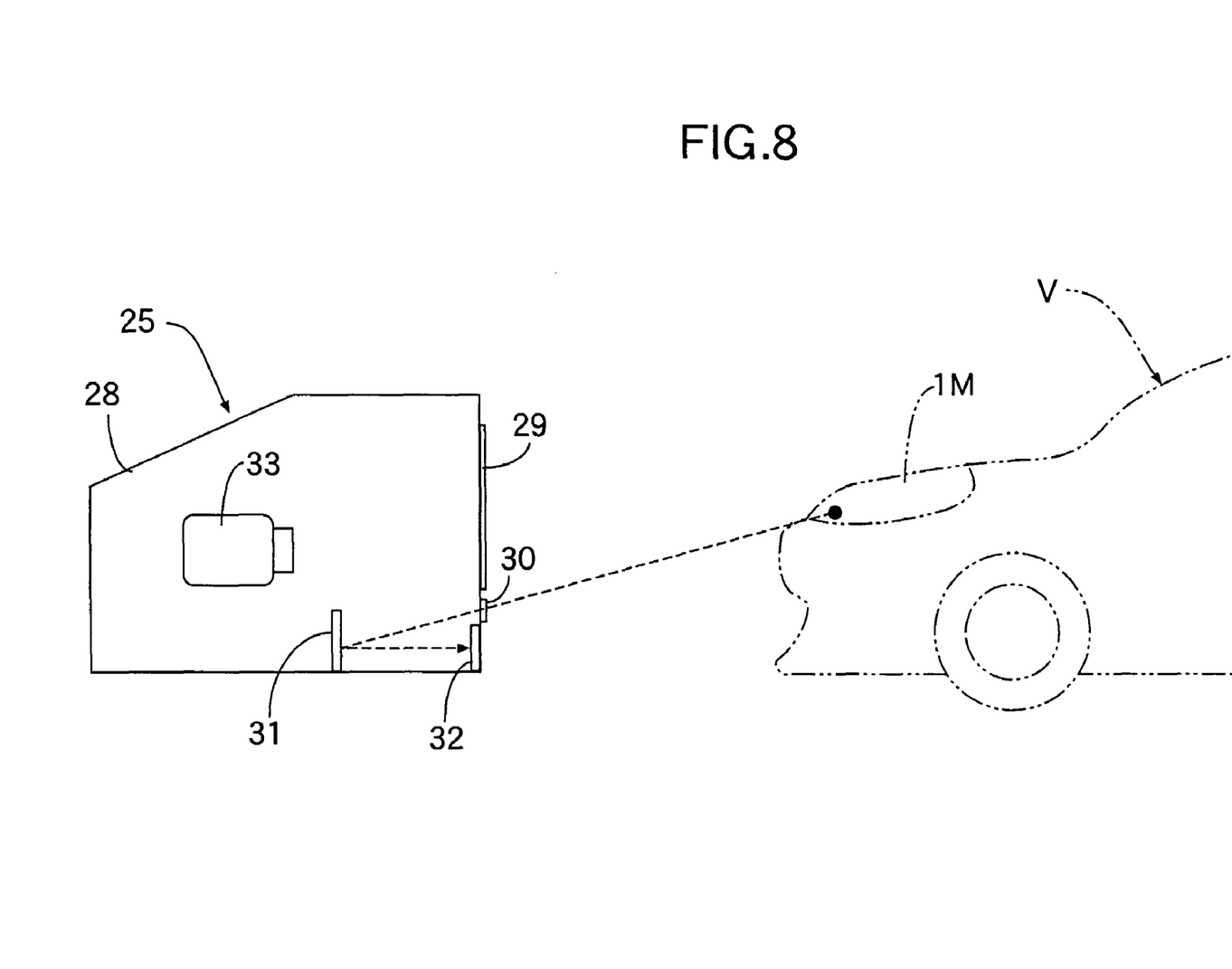
FIG. 8 is a diagram showing an outline arrangement of the measurement unit.

In FIG. 8, a housing 28 of the measurement unit 25 is provided with a light distribution detection window 29 and a bulb center detection window 30, which is positioned beneath the light distribution detection window 29, so as to face the master automobile V. Fixedly provided within the housing 28 are a reflection mirror 31 for reflecting incoming light through the bulb center detection window 30, a screen 32 on which the reflected light from the reflection mirror 31 is projected, and a CCD camera 33 for picking up an image of the light coming in through the light distribution detection window 29 and the projected light image on the screen 32.

Figure 9:
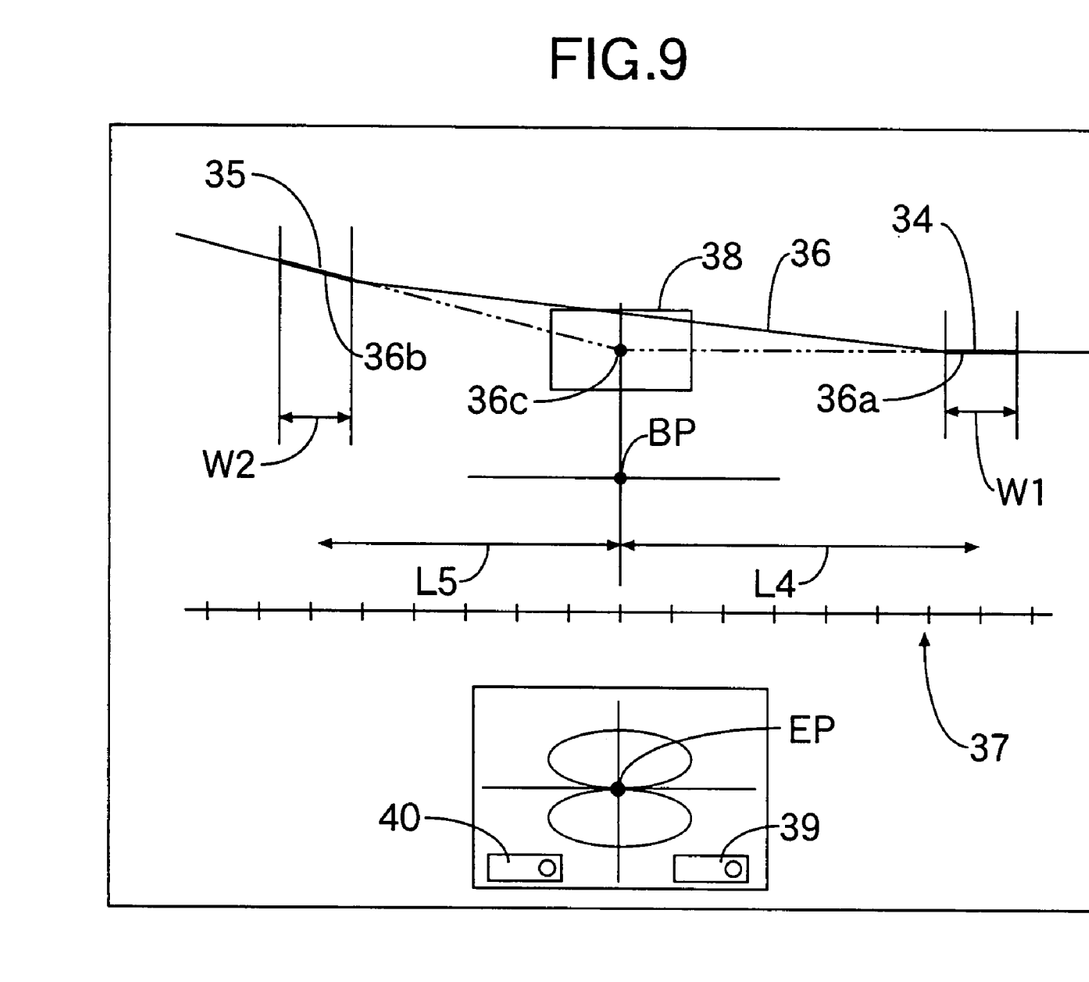
FIG. 9 is a diagram showing an imaged picture of low beam illumination from the master headlight.

A light distribution pattern of low beam illumination that enters through the light distribution detection window 29 from the master headlight 1M is picked up by the CCD camera 33, and appears as shown in FIG. 9 on an upper part of the picture of the monitor 26. Displayed on the picture of the monitor 26 are a horizontal line cursor 34 for setting a horizontal line, whose position and width can be adjusted, and an oblique line cursor 35 for setting an oblique line, whose position, width, and inclination angle can be adjusted.

Since the vertical direction and the lateral direction of the measurement unit 25 are set so that the center of the measurement unit 25 coincides with the bulb center C of the master headlight 1M, a reference point BP corresponding to the bulb center C is displayed in a central area of the imaged picture. Moreover, a light/dark boundary line 36 is also displayed on the imaged picture, and by moving the horizontal line cursor 34 and the oblique line cursor 35 onto a horizontal line 36a and an oblique line 36b that are stable on the light/dark boundary line 36, the relative positional relationship between the reference point BP and the horizontal line cursor 34 and the oblique line cursor 35, that is, the horizontal line 36a and the oblique line 36b of the light/dark boundary line 36, are set based on a scale 37 displayed on the imaged picture. With regard to this relative positional relationship, a distance L4 between the reference point BP and the center of the horizontal line 36a, a width W1 of the horizontal line 36a, a distance L5 between the reference point BP and the center of the oblique line 36b, a width W2 of the oblique line 36b, and the inclination angle of the oblique line 36b are set, and the set values are registered in a CPU installed in the measurement operation panel 27. Furthermore, an intersection point 36c of the horizontal line 36a and the oblique line 36b of the light/dark boundary line 36, which can be determined by the horizontal line cursor 34 and the oblique line cursor 35, is determined, and an acceptance frame 38 is set based on the imaged position of the intersection point 36c and is registered in the CPU.

Figure 10:
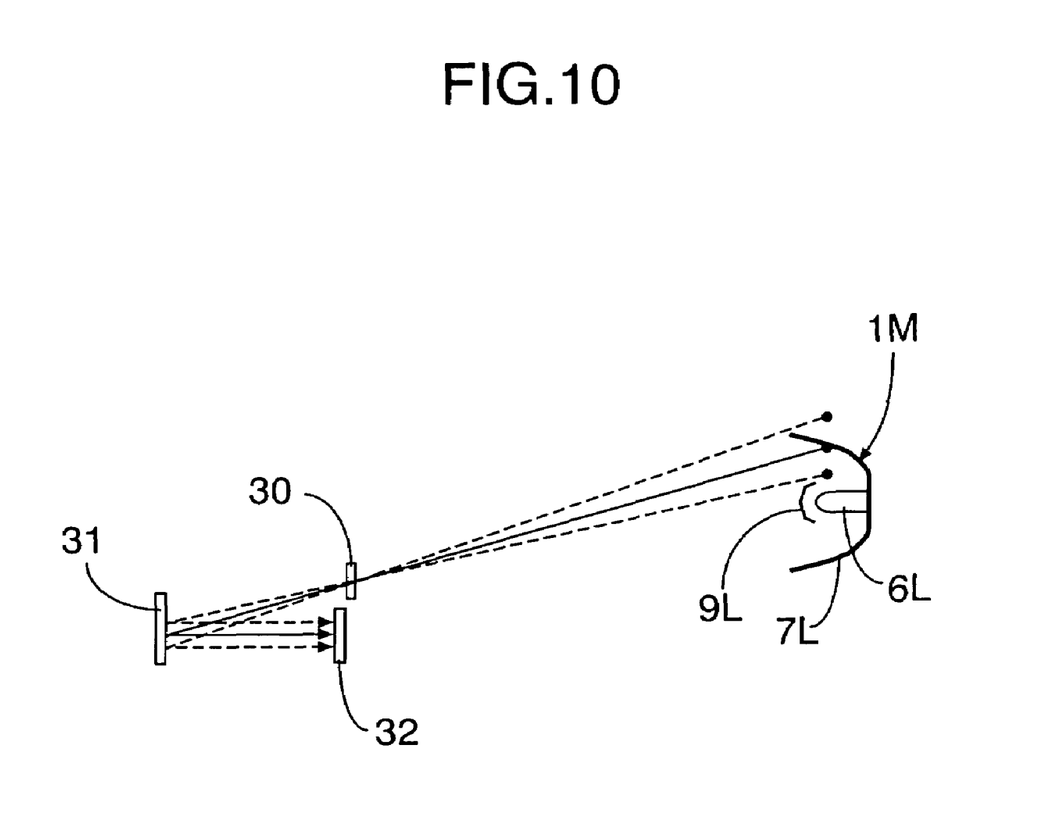
FIG. 10 is a diagram for explaining an image of light projected on the screen from the master headlight.

Displayed in a lower part of a central area on the picture of the monitor 26 is an estimated position EP of the bulb center C based on the image of light projected on the screen 32, the light being reflected by the reflection mirror 31 after entering through the bulb center detection window 30. As shown in FIG. 10, light reflected from an upper part of the reflector 7L, which is an area of the reflector 7L of the master headlight 1M, enters the bulb center detection window 30 of the measurement unit 25, and since the shade 9L is located in front of the reflector 7L, the image of light projected on the screen 32 is divided into upper and lower parts, and the center of the image of the projected light is defined as the estimated position EP of the bulb center C. During this process, since the center of the measurement unit 25 coincides with the bulb center C of the master headlight 1M, the estimated position EP coincides with the intersection point of vertical and lateral reference lines.

Furthermore, as shown by broken lines in FIG. 10, when the bulb center C moves up and down the estimated position EP is displayed on the screen 32 while deviating below and above the intersection point of the vertical and lateral reference lines; when the bulb center C moves to the left and right the estimated position EP is displayed on the screen 32 while deviating to the right and left of the intersection point of the vertical and lateral reference lines; the amount of deviation in the vertical direction is displayed in a window 39 and the amount of deviation in the lateral direction is displayed in a window 40. In the case of the master headlight 1M, the windows 39 and 40 display '0'.

When the amounts of deviation are displayed in the windows 39 and 40, by inputting values corresponding to the amounts of deviation through the measurement operation panel 27, the reference position BP and the acceptance frame 38 move on the imaged picture of the monitor 26 by amounts corresponding to the deviation.

Figure 11:
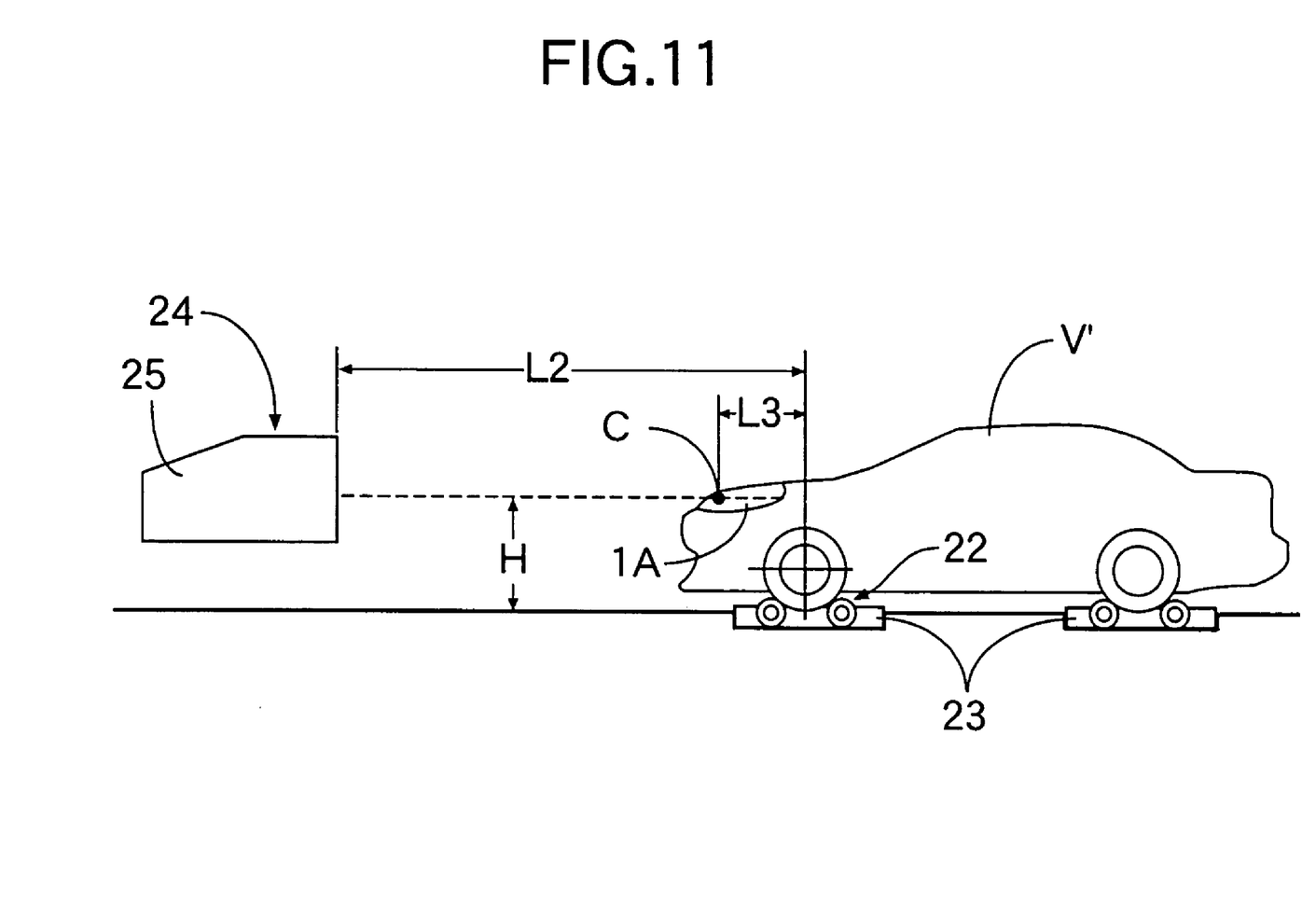
FIG. 11 is a side view, corresponding to FIG. 7, of a state in which a headlight to be adjusted is made to face the measurement unit straight on, and FIG. 12 is a diagram showing an imaged picture of low beam illumination from the headlight to be adjusted.

In this way, after the acceptance frame 38 is determined using the master headlight 1M, as shown in FIG. 11, an automobile to be adjusted V' equipped with headlights to be adjusted 1A whose optical axes are to be adjusted is brought in front of the measurement units 25, and after the distance between the measurement units and the bulb centers C of the headlights to be adjusted 1A is set at the set distance (L2-L3), a low beam is emitted forward from the headlights to be adjusted 1A.

Figure 12:
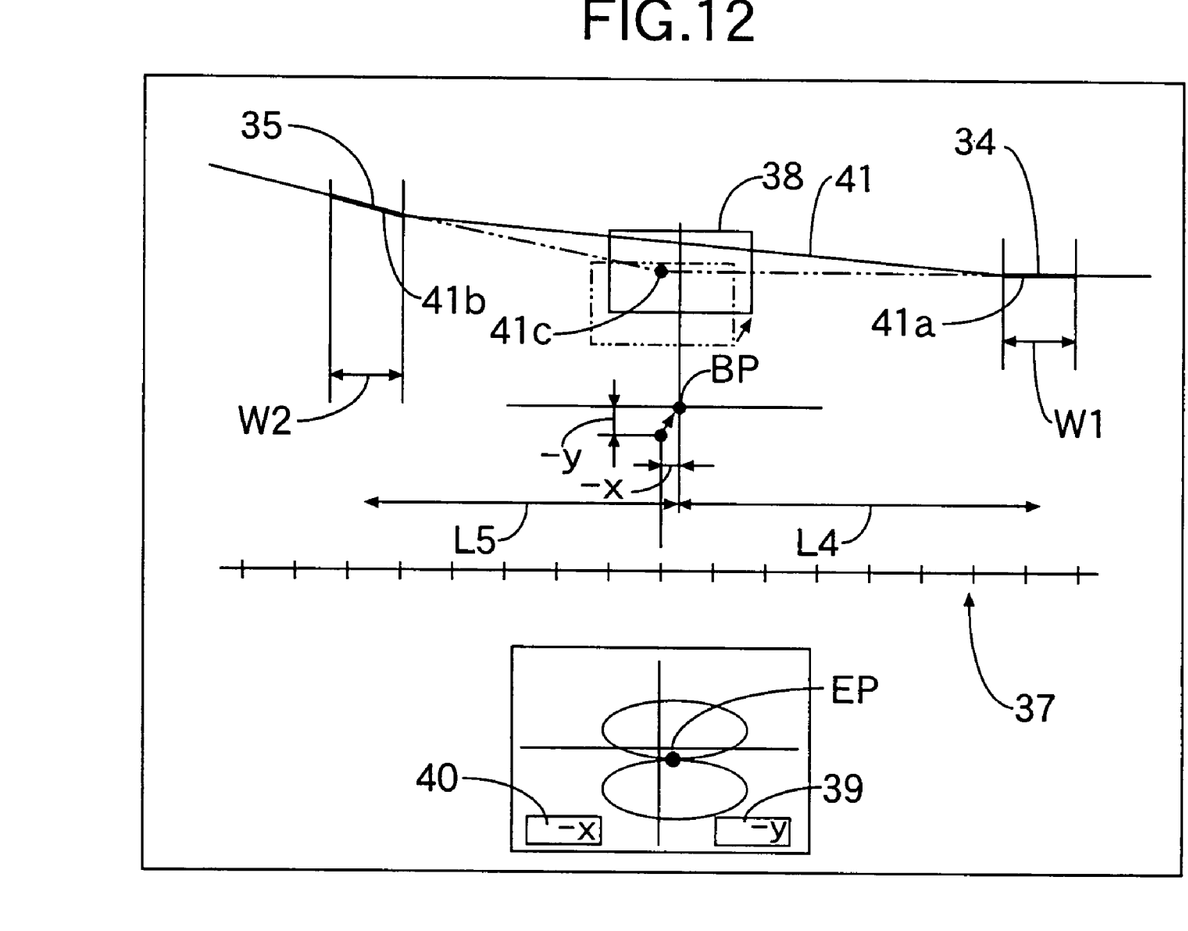

An imaged picture obtained by picking up the light distribution pattern of this low beam illumination from the headlight to be adjusted 1A with the CCD camera 33 is displayed on the monitor 26 as shown in FIG. 12.

When the windows 39 and 40 display '–y' and '–x', by inputting values corresponding to the amounts of deviation through the measurement operation panel 27, the reference position BP and the acceptance frame 38 are moved upward and rightward on the imaged picture of the monitor 26 by amounts corresponding to the deviation.

Based on the positional relationship relative to the reference point BP determined using the master headlight 1M, a horizontal line 41a and an oblique line 41b in the light/dark boundary line 41 displayed on the imaged picture are detected, at the same time an intersection point 41c of the detected horizontal line 41a and the detected oblique line 41b is determined, and by carrying out in sequence adjustment of the optical axis of the headlight to be adjusted 1A so that the intersection point 41c is present within the acceptance frame 38 for the left and right headlights to be adjusted 1A, optical axis adjustment of the headlights to be adjusted 1A of the automobile to be adjusted V' is completed.

To explain the operation of this embodiment, when adjusting the low beam optical axis of the headlight 1, a first step of, on an imaged picture of a light distribution pattern of low beam illumination from the master headlight 1M whose optical axis has been adjusted, the picture being imaged at a predetermined distance in front of the master headlight 1M, determining a relative positional relationship between the reference point BP and the horizontal line 36a and the oblique line 36b of the light/dark boundary line 36, and setting the acceptance frame 38 based on an imaged position of the intersection point 36c of the horizontal line 36a and the oblique line 36b; and a second step of, on an imaged picture of a light distribution pattern of low beam illumination from the headlight to be adjusted 1A whose optical axis is to be adjusted, the picture being imaged at the predetermined distance in front of the headlight to be adjusted 1A, detecting the horizontal line 41a and the oblique line 41b of the light/dark boundary line 41 based on the relative positional relationship with the reference point BP, and adjusting the optical axis of the headlight to be adjusted 1A so that the intersection point 41c of the detected horizontal line 41a and the detected oblique line 41b is present within the acceptance frame 38, are carried out in sequence, and in the first and second steps the position on the imaged picture corresponding to the bulb centers C that are set in advance on the front face lenses 3 of the master headlights 1M and the headlight to be adjusted 1A is determined as the reference point BP.

The relative positional relationships between the bulb center C, which is determined in advance on the front face lens 3 of the headlight 1 that emits a low beam, and the intersection points 36c and 41c based on the light/dark boundary lines 36 and 41 fluctuate little due to an error in bulb mounting position in the headlight 1, uneven coating of the reflector 7L, etc.; as described above, the horizontal line 41a and the oblique line 41b of the light/dark boundary line 41 of the headlight to be adjusted 1A are detected using as the reference point BP the positions, on the imaged pictures, that correspond to the bulb centers C, which are set in advance on the front face lenses 3 of the master headlight 1M and the headlight to be adjusted 1A, and the optical axis is adjusted so that the intersection point 41c of the detected horizontal line 41a and the detected oblique line 41b is present within the acceptance frame 38, thus enabling the precision of the optical axis adjustment to be enhanced.

Moreover, since in the first step employing the master headlight 1M, the reference point BP on the imaged picture is determined according to measurement of the vertical and lateral positions of the bulb center C, which is set in advance on the front face lens 3 of the master headlight 1M, and in the second step the position of the bulb center C, which is set in advance on the front face lens 3 of the headlight to be adjusted 1A, is estimated based on the image of light projected on the screen 32, the light being reflected from one area of the reflector 7L of the headlight to be adjusted 1A, and the position of the bulb center C thus estimated is used as the reference point BP, when carrying out optical axis adjustment of the headlight to be adjusted 1A, it is unnecessary to measure the vertical and lateral positions of the bulb center C on the front face lens 3, and when there are a large number of headlights to be adjusted 1A the optical axis can be adjusted efficiently.

Although an embodiment of the present invention is explained above, the present invention should not be construed as being limited by the embodiment and can be modified in a variety of ways without departing from the spirit and scope thereof described in Claims.

The invention claimed is:

1. A headlight optical axis adjustment method for adjusting a low beam optical axis of a headlight that has a vertically adjustable optical axis in a state in which the headlight is installed in an automobile, the method comprising carrying out in sequence: a first step of, on an imaged picture of a light distribution pattern of low beam illumination from a master headlight whose optical axis has been adjusted, the imaged picture being imaged at a predetermined distance in front of the master headlight, determining a relative positional relationship between a reference point and a horizontal line and an oblique line of a light/dark boundary line and setting an acceptance frame based on an imaged position of an intersection point of the horizontal line and the oblique line; and a second step of, on an imaged picture of a light distribution pattern of low beam illumination from a headlight to be adjusted whose optical axis is to be adjusted, the imaged picture being imaged at the predetermined distance in front of the headlight to be adjusted, detecting a horizontal line and an oblique line of a light/dark boundary line based on the relative positional relationship with the reference point and adjusting the optical axis of the headlight to be adjusted so that an intersection point of the detected horizontal line and oblique line is present within the acceptance frame;

wherein in the first and second steps a position on the imaged picture corresponding to a bulb center that is set in advance on a front face lens of the master headlight and the headlight to be adjusted is determined as the reference point, and wherein in the first step the reference point on the imaged picture is determined according to measurement of vertical and lateral positions of the bulb center, which is set in advance on the front face lens of the master headlight, and in the second step the position of the bulb center, which is set in advance on the front face lens of the headlight to be adjusted, is estimated based on an image of light reflected from an area of a reflector of the headlight to be adjusted and projected on a screen, and the estimated position of the bulb center is employed as the reference point.

2. A headlight optical axis adjustment method for adjusting a low beam optical axis of a headlight that has a vertically adjustable optical axis in a state in which the headlight is installed in an automobile, the method comprising:

a first step of, on an imaged picture of a light distribution pattern of low beam illumination from a master headlight whose optical axis has been adjusted, the imaged picture being imaged at a predetermined distance in front of the master headlight, determining a reference point on the imaged picture according to measurement of vertical and lateral positions of a bulb center, which is set in advance on a front face lens of the master headlight; and a second step of, on an imaged picture of a light distribution pattern of low beam illumination from a headlight to be adjusted whose optical axis is to be adjusted, the picture being imaged at the predetermined distance in front of the headlight to be adjusted, estimating the position of the bulb center, which is set in advance on a front face lens of the headlight to be adjusted, based on an image of light reflected from an area of a reflector of the headlight to be adjusted and projected on a screen, and employing the estimated position of the bulb center as the reference point.

* * * * *